US009880007B2

(12) United States Patent
Whiting

(10) Patent No.: US 9,880,007 B2
(45) Date of Patent: Jan. 30, 2018

(54) NAVIGATIONAL AID SYSTEM FOR FISHERMEN

(76) Inventor: Jonathan Merrill Whiting, Dukes County, MA (US)

(*) Notice: Subject to any disclaimer, the term of this patent is extended or adjusted under 35 U.S.C. 154(b) by 866 days.

(21) Appl. No.: 11/588,988

(22) Filed: Oct. 27, 2006

(65) Prior Publication Data

US 2008/0103695 A1 May 1, 2008

(51) Int. Cl.
*G01C 21/20* (2006.01)
*G09B 29/00* (2006.01)
*G06F 17/30* (2006.01)

(52) U.S. Cl.
CPC ..... *G01C 21/203* (2013.01); *G06F 17/30241* (2013.01); *G09B 29/007* (2013.01)

(58) Field of Classification Search
CPC .. G09B 29/007; G01C 21/005; G01C 21/203; G06F 17/30241
USPC .............. 340/995.1, 995.11, 995.14, 995.15, 340/995.26; 701/208, 213, 400, 408, 409, 701/461, 462, 468, 487, 516, 532, 538
See application file for complete search history.

(56) References Cited

U.S. PATENT DOCUMENTS

| | | | | |
|---|---|---|---|---|
| 5,327,398 | A | 7/1994 | Wansley et al. | 367/108 |
| 5,379,224 | A * | 1/1995 | Brown et al. | 701/215 |
| 5,928,304 | A | 7/1999 | Priess | 701/200 |
| 6,088,654 | A | 7/2000 | Lepere et al. | 701/301 |
| 6,314,370 | B1 * | 11/2001 | Curtright | 701/213 |
| 6,941,226 | B2 | 9/2005 | Estep | 701/213 |
| 2005/0228581 | A1 * | 10/2005 | Taboada | 701/200 |
| 2006/0178818 | A1 | 8/2006 | Dhollande | 701/209 |

OTHER PUBLICATIONS

VI GPS, Accessed: Dec. 29, 2005, Rominten, http://www.rominten.com/VIGps.*
gps.net Visualization Tools, Accessed: May 7, 2004, http://www.shareup.com/GPS.NET_Visualization_Tools-download-14532.html.*
Oceantemp, http://www.oceantemp.com/1mainframe.htm?samples.shtml~main.*

(Continued)

*Primary Examiner* — Spencer D Patton
(74) *Attorney, Agent, or Firm* — Ernest D. Buff & Associates, LLC; Ernest D. Buff, Esq.; Harry Anagnost, Esq.

(57) ABSTRACT

A navigational aid system for fishermen comprises a computer that is connected to the Internet. The computer accesses a high resolution map in the vicinity of a fishing boat. The map depicts the ocean temperature and depth profile in relation to marked latitude and longitudinal indicators. A specialized GPS system in communication with the computer depicts the latitudinal and longitudinal position of the fisherman's boat. The computer executes a separate program that has a transparent window overlaying the map. A user selects two points, one point at a time, on the map and enters corresponding latitude and longitude bearings consistent with those shown on the map. The separate program receives the GPS data and plots the boat position in an orthogonal coordinate system based on the two points selected and their corresponding coordinates. The map is optionally provided with data concerning weather and buoy or wreck hazards in the vicinity of the boat, together with details concerning the coastline.

3 Claims, 5 Drawing Sheets

(56) References Cited

OTHER PUBLICATIONS

VIGps, Dec. 24, 2005, http://www.sharewareconnection.com/vigps.htm.*
http://marine.rutgers.edu/cool/sat_data/?product=sst&nothumbs=1, Rutgers University Costal Ocean Observation Lab Operations Center.
http://www.osdpd.noaa.gov/PSB/EPS/SST/contour.html, NOAA Satellites and Information, Office of Satellite Data Processing and Distribution.
http://www.thecoolroom.org/fishermen/fish_help_sst.htm, TheCOOL room-Home of the Underwater Weather for he New Jersey Coast, Rutgers University Costal Ocean Observation Lab.
http://www.oceantemp.com/1mainframe.htm?samples.shtml~main, Oceantemp Satellite Imaginge scince 1994.
http://www.oceantemp.com, Oceantemp™ Satellite Imaging Since 1944 Overview.
http://www.weather.com, The Weather Channel's home page, Nov. 25, 2006.

\* cited by examiner

--Prior Art--

--Prior Art--

--Prior Art--

--Prior Art--

NAVIGATIONAL AID SYSTEM FOR FISHERMEN

BACKGROUND OF THE INVENTION

1. Field of the Invention

The present invention relates to navigational aid systems; and more particularly, to a navigational aid system especially suited for use in an ocean or other large water body to correlate the location of a fishing boat with water temperatures, water depth, nautical obstacles and local weather conditions that facilitate fish finding in a safe, efficient manner.

2. Description of the Prior Art

A number of satellites have been launched in geosynchronous orbits or asynchronous orbits to gather and provide weather information, infrared telemetry of clouds, measurement of ground temperature and ocean surface temperatures as well as military specific data. Some of this data such as a view of the earth from space (GOOGLE® earth Internet application) is readily available from the Internet. Similarly, ocean surface temperature maps are available to the public on the website of the Rutgers Institute of Marine and Coastal Sciences (henceforth the "Rutgers Marine Institute") or the website of the National Oceanic and Atmospheric Administration, Office of Satellite Date Processing and Distribution (henceforth "NOAA") which uses computer correlation of satellite data acquired during multiple passes of one or more satellites to generate false color temperature profiles. The NOAA website contains a map that shows temperature contour lines. The map encompasses 16 degrees latitude×22 degrees longitude or 960×1320 nautical miles or 1105×1519 miles (1778×2445 kilometers), which constitutes a very large area, as shown in FIG. 1. The Rutgers Marine Institute website allows a section of specific area in the eastern united states to be magnified. The data is updated in an interval of several hours by NOAA. These maps have false color indications of temperature and indicate one or two ocean depth contours, which are very coarse. The size of the map is 3 latitude degrees by 4.5 longitudinal degrees or 180×270 nautical miles, or 207×312 miles (333×502 kilometers), as shown in FIG. 2. Even though this mapped area is smaller than the NOAA map it still occupies a vast area, such as all of east coast and the like. Consequently, the map has minimal special resolution for defining the local water temperature or ocean depth as a fishing boat travels on the ocean or large body of water. In addition, there are problems with these maps since the coastline in these maps does not match the actual coast line due to the relatively high temperatures of the same. Also, clouds mask the sea temperature visibility and these and other areas provide an off-scale reading for temperature. Problems in interpreting these images are discussed in detail at the thecoolroom.org website. Both of these maps provide reference latitude and longitude values, but locations described by a given GPS provided ocean latitude and longitude may not be properly placed on the maps due to the coarse map dimensions, and the information obtained by using these maps tends to be too misleading and inaccurate to reliably match these parameters to provide ocean temperature information at a given GPS provided. Therefore these color map and contour profiles at best provide a coarse indication of ocean depth or ocean temperature and therefore are clearly unsuited for guiding a fisherman traveling in a boat to specific location that present an optimum fishing opportunity.

The OCEANTEMP™ website provides a subscription service of ocean temperature that is updated twice daily and includes a more precise map of ocean surface temperature, ocean depth and presence of obstructions such as buoys, wrecks and the like. The larger area map is shown in FIG. 3. This figure encompasses 2.3 degrees latitude by 2.3 degrees longitude or 138×138 nautical miles or 159×159 miles (256×256 kilometers). The magnified version of the map obtained by a left mouse button click displays a detailed map, as shown in FIG. 4, which is typically 1 degree latitude by 1 degree or 60×60 nautical miles or 69×69 miles (111× 111 kilometers). This magnification is sufficient to show all the details of the ocean surface temperature and ocean depth usable by a fisherman. Unfortunately, no indication is provided by the map concerning the extant location of the boat. The map does not disclose or suggest means that enable a fisherman to determine if and when his boat crosses an interesting thermal profile, such as water upwelling, where more fish are likely to be found.

The OCEANTEMP™ software also provides an overlay of cloud cover data using GOES IR satellite data. This cloud cover is obtained from low resolution images and is generally not as precise as the ocean sea water temperature or the ocean depth profile. This is a separate map that is not coincident with the latitude/longitude locations displayed by the ocean temperature/ocean depth map and is used for general guidance of local weather.

THE WEATHER CHANNEL® website provides satellite based images and Doppler radar images of cloud cover and weather patterns. These maps outline the continent or satellite boundaries, together with coastline details, but do not provide latitude/longitude lines. Thus, matching these satellite images with ocean surface temperature data requires matching of coastlines.

U.S. Pat. No. 5,327,398 to Wansley, et al. discloses a fishfinder that provides a readout of bottom coverage. This fishfinder uses an electromechanical transducer for transmitting sound waves into the water in the form a triangular conical beam. The echo generated by a fish or other bottom feature is received by a receiving transducer. Time delay data is converted to distance and is displayed on a real time display. This device shows bottom features directly under the transducer conical beam, but does not show any depth change or obstructions in the path of the fisherman's boat. No information is provided concerning an ocean temperature profile.

Notwithstanding the efforts of prior art workers to construct maps containing data that indicate ocean surface temperatures, ocean depth profiles and presence of obstructions, no attempt has been made to correlate that data with the precise location of a fisherman's boat as it travels through the water to reveal an ocean thermal profile, ocean water depth or hazard location, such as a wreck or the like, that is immediately at hand. Consequently, there remains a need in the art for a system that correlates ocean temperature data with the presence of a fishing boat, and which provides improved guidance concerning locations where fish may be more abundant, thereby increasing prospects for a successful catch.

SUMMARY OF THE INVENTION

The present invention provides a navigational aid that facilitates fish finding in a safe, efficient manner. Data indicative of ocean surface temperatures, ocean depth profiles and presence of obstructions, is correlated with the precise location of a fisherman's boat. In this manner there are revealed, an ocean thermal profile, ocean water depth or hazard location, such as a wreck or the like, that is immediately at hand. Improved guidance concerning locations where fish may be more abundant increases prospects for a safe, successful catch.

In one aspect of the invention, there is provided a navigational aid that combines data concerning ocean surface temperature and ocean depth profile with data indicating the precise location of a fisherman's boat as it travels within a large water body, such as a great lake, the Nantucket Sound or the Atlantic Ocean. Preferably, in use of the navigational aid, data containing such details are provided within a 10-30 mile (16-48 kilometer) region surrounding the fisherman's boat. Generally, in accordance with the invention, there is provided a method comprising the steps of: 1) connecting a computer system having with Internet connection capability to an Internet site and downloading a current ocean temperature profile of a region as a grid representing approximately a 159 mile (256 kilometer) square area; 2) magnifying the displayed area to view a high resolution image in a 60 mile (97 kilometer) square area; 3) running a separate computer program that has a transparent window that asks for input of latitude and longitude for two grid locations that can be manually typed in; 4) clicking a mouse associated with the computer at the first latitude/longitude intersection point and entering the corresponding latitude and longitude numbers as indicated in the magnified ocean temperature map; 5) clicking on a second latitude/longitude point and entering its latitude and longitude values as indicated in the magnified temperature map; 6) the computer accepting these inputted data and constructing a grid which has latitude on the Y axis and longitude in the X axis; 7) a specially designed GPS unit connected to the computer collecting data from several satellites to determine the latitude and longitude of a boat's current location; 7) the specially designed GPS unit communicating the latitude and longitude coordinates to the computer; and 8) the separate computer program drawing the pictorial representation of the boat on the X-Y grid of the transparent window displaying the fisherman's boat as an overlay on the ocean temperature/ocean depth map. As the fisherman's boat travels on the ocean, the GPS unit periodically updates the latitude and longitudinal coordinates of the boat and the computer program updates the position of the boat, by first erasing the previously displayed position. The boat pointing direction is rotated to match the movement direction of the boat. The fisherman is now provided with detailed information of the ocean temperature and depth profiles in the area of the boat along the direction of travel as well as hazardous locations. Since the fisherman is not expected to travel 60 miles (97 kilometers), the displayed ocean surface temperature/ocean depth map remains in place unchanged and only the boat location is updated. When the user comes to the boundaries of the displayed map grid, the fisherman loads an updated magnified map and establishes the coordinate correlation thereof with the computer program that displays the boat location in the map. The correlation between the boat location and an ocean thermal profile, ocean water depth or hazard location, such as a wreck or the like, guides the fisherman to locations where fish are likely to be found, increasing prospects for a safe, successful catch.

BRIEF DESCRIPTION OF THE DRAWING

The invention will be more fully understood and further advantages will become apparent when reference is had to the following detailed description of the preferred embodiments of the invention and the accompanying drawings, in which.

DETAILED DESCRIPTION OF THE INVENTION

Figure 1:
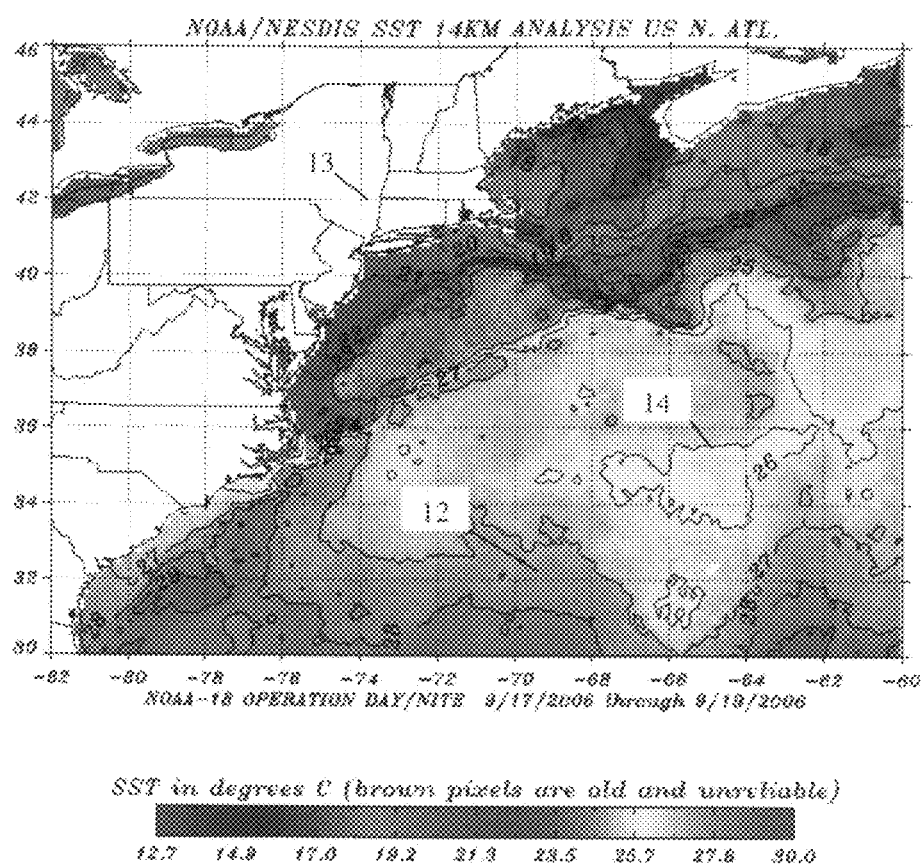
FIG. 1 is a large area ocean temperature map provided by web site that is conventional in the art.

The present invention uses publicly available information comprising ocean surface temperatures provided by multiple passes of a NASA satellite. The multi pass information is computer correlated by NOAA to provide a false color temperature profile map or corresponding temperature contour lines. The information is available to the public as large binary data corresponding to each pass of the NASA satellite that measures output from the ocean surface at different wavelengths. Such information is used to generate the surface temperature profiles. These satellites rotate in an orbit that is over 500 miles (805 kilometers) high. Consequently, the visibility of the ocean surface can be reduced or prevented by a number of factors, including cloud cover. When cloud cover is present, these NOAA or Rutgers Marine Institute websites present a white region indicating out of range data present. Other anomalies include high temperature emitted by sand in coastal areas changing the shape of a geographical coastline. The Rutgers University map has additional information on a few contours of ocean depth. Both satellite generated maps show latitude and longitude lines. These web sites are freely available to the public. However, the area covered by these maps is very large. Thus, locating a fisherman's boat in this map presents a series deficiencies. The placement of a fisherman's boat in these maps requires the exact location of at least two latitude and longitude locations. Due to the large area covered by these maps, this location is very imprecise. A boat may be located hundreds of miles away from its precise location in the map; and the ability of a fisherman to ascertain the ocean temperature profile is correspondingly imprecise. Due to changes in the shape of the coastline as stated above, the fisherman cannot readily correlate a boat position using the physical shape of the coastline. Subscription services such as that provided by the OCEANTEMP™ or ROFFS™ websites receive the satellite binary data and calculate the ocean surface temperature by eliminating error prone data. These services provide more detailed ocean temperature data, which is updated twice daily. Moreover, these OCEANTEMP™ maps contain detailed ocean depth profiles as well as the presence of buoys, ship wrecks or other hazardous objects. They also provide OCEANTEMP™ software, which loads the map from their website with additional program features that are not related to the subject invention. The large area map covers 159 miles (256 kilometers) square, while a magnified map covers about 60 miles (97 kilometers) square, which is adequate detail for most fishermen. First, this magnified image of the representative area of the boat is loaded into the computer using an Internet browser program or OCEANTEMP™ provided software.

The fishfinding system of the present invention uses a specially designed GPS unit for locating the fisherman's boat in the magnified map of the ocean temperature and depth profile. Every GPS unit receives time signals from several satellites and correlates the arrival times of the signals to calculate the latitude and longitude of the location of the GPS unit. Several of the GPS units made from manufacturers such as GARMIN®, MAGELLIN®, NORTHSTAR® etc. also provide a detailed display of land map including highways, places of interest etc. from a hard disk data file, locating the car location in the hard disk data map. The location of the GPS is indicated by its latitude, longitude and height above sea level. For a boat sailing on a sea surface, the height is always zero and the only important location values are latitude and longitude. This information generally is retained in the GPS unit and is not communicated to an outside unit such as a computer. The specially designed GPS has a software program resident in memory that sends the longitude and latitude values through a serial connection such as a universal serial bus (USB). This data may be provided without computer request and may be retained in a buffer.

The computer has a separate program, which has its own menu items. This computer program is launched after the user loads the magnified image of the ocean surface temperature and depth profile map as stated earlier. This computer has a transparent window through which the underlying ocean temperature, ocean depth map is seen and the user has to click on a first point in the screen using a mouse to identify and enter that point's latitude and longitude values in an edit field. The user has to select a second point, preferably further away from the first point, and identifies its latitude and longitude in a second edit field. Generally, these points are crossing points of the magnified latitude and longitude in the ocean temperature ocean depth map. Now the separate computer program is completely calibrated and is in registry with the magnified map. The separate computer next receives the GPS provided latitude and longitude values from the buffer memory and plots this location in the map as a pictogram of a boat which is drawn solid and resides in the transparent window frame of the separate computer program displaying the fisherman's boat in the magnified ocean surface temperature and ocean depth profile map. If the user clicks over the transparent map area, the mouse click is trapped and ignored. As the fisherman's boat sails, the GPS latitude and longitude values are updated, received by the separate computer program. The old position of the fisherman's boat is erased and the new position is immediately drawn.

When the boat reaches the boundaries of the magnified ocean surface temperature ocean depth map. The user quits the separate program, and moves the magnified viewing area by using the scroll bars of the Internet browser program or OCEANTEMP™ program to display the appropriate region of the map. The user launches the separate computer program and identifies two locations with two mouse clicks and enters corresponding latitude and longitude values for each of the two points, establishing the correlation between the displayed map and the GPS coordinates.

The weather map available from weather.com does not have markings for latitude and longitude. It has only boundaries marked for coastlines. The weather map of a local region may be downloaded weather from a Doppler radar image of the IR satellite image depicting the clouds, and the land masses may be manually matched over the coast line of the magnified ocean surface temperature and ocean depth profile map using any standard photo editing software, such as ADOBE PHOTOSHOP®. The boat position may be located on this map using the separate computer program as described herein. Now the fisherman can be aware of impending strong storm situations in addition the ocean surface temperature and ocean depth.

The pictogram of the boat displayed by the program may be any suitable figure. Based on the movement of the boat, the orientation of the boat may be rotated to display the movement direction of the boat in the displayed ocean surface temperature and ocean depth profile map.

Fish generally are present at the intersection of warm and cold temperatures due to upward welling of water flow. Plankton accumulates in this region and small and large fish are attracted to this boundary. The fisherman can locate these fish abundant areas using the ocean surface temperature detailed map that refers to the exact location of the boat. When this warm cold temperature boundary is present with good ocean depth, it is usually frequented by the presence of large size fish.

FIG. 1 illustrates a conventional large area map provided by the NOAA website. In this figure, reference numeral 12 is the 42 degree latitude line and 13 is the −70 degree longitudinal line. The 26 degrees isotemperature contour line is shown at 14. The ocean temperature map covers a latitude range of 16 degrees and longitude range of 22 degrees. This represents an area that is 1519 miles (2445 kilometers) wide 1105 miles (1778 kilometers) tall. While this map may be used for locating the fisherman's boat, the precision of its location is severely compromised by the large scale of the map.

Figure 2:
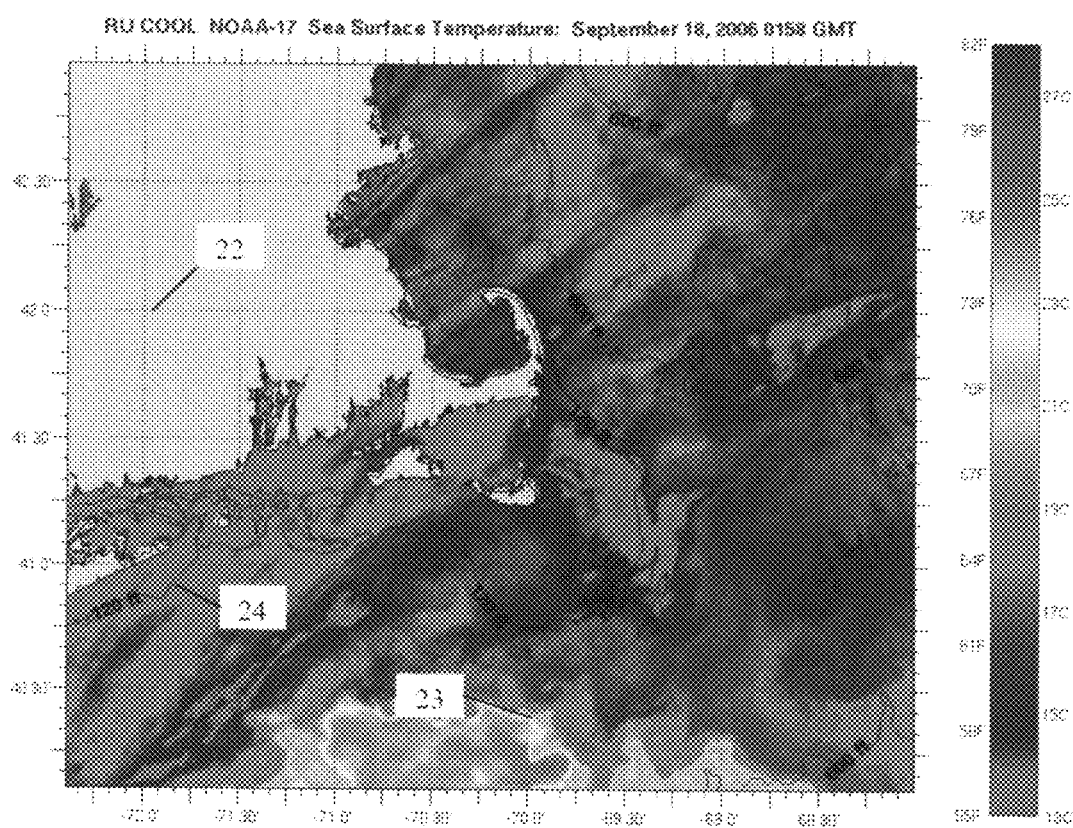
FIG. 2 is a large area ocean temperature map provided a web site that is conventional in the art.

FIG. 2 illustrates the prior art large area map provided by the Rutgers Marine Institute website. In this figure, reference numeral 22 is the 42 degree latitude line and 23 is the −70 longitudinal line. The ocean temperature map covers a smaller area than that represented in FIG. 1. That is to say, the area covered is 312 miles (502 kilometers) wide and 207 miles (333 kilometers) tall. This map may be used for locating the fisherman's boat, but the precision of location will still be inadequate. The depth information contour provided at 24 is sparse and is not very useful.

Figure 3:
FIG. 3 is a large area ocean temperature map provided by a web that is conventional in the art.

FIG. 3 illustrates the prior art large area map provided by the OCEANTEMP™ website. In this figure, 32 is the 42 degree latitude line and 33 is the −70 longitudinal line. The ocean temperature map covers a smaller area than that represented in FIG. 1 or FIG. 2. That is to say, the area covered is 159 miles (256 kilometers) wide and 159 miles (256 kilometers) tall. This map may be used for locating the fisherman's boat, but the precision of location will still tend to be inadequate. The depth contour information is provided at 34, which is 10 feet (3 meters) and is useful. In addition to color indication, water temperature is indicated as actual numbers.

Figure 4:
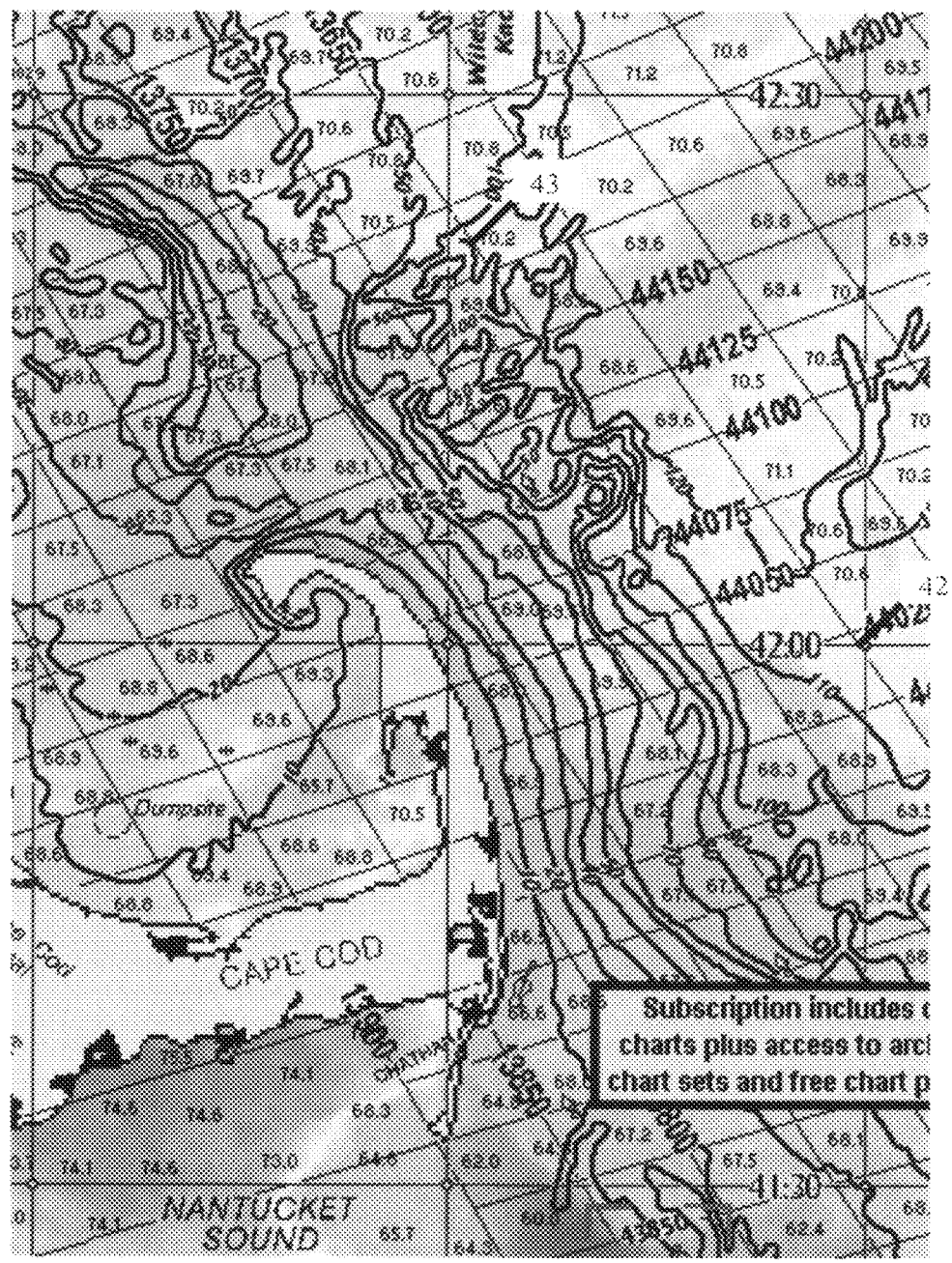
FIG. 4 is an enlarged map of a portion of regions displayed in FIG. 3.

FIG. 4 shows an enlarged view of FIG. 4 obtained by left mouse clicking on the figure. This magnifies the image approximately 4 times and covers an area roughly 1 degree by 1 degree or 69 by 69 miles (111 kilometers). This area is very reasonable for a fisherman's boat travel and the details provided are very useful. Again the 42 degree latitude is shown at 42, and the −70 longitudinal line is shown at 43.

Figure 5:
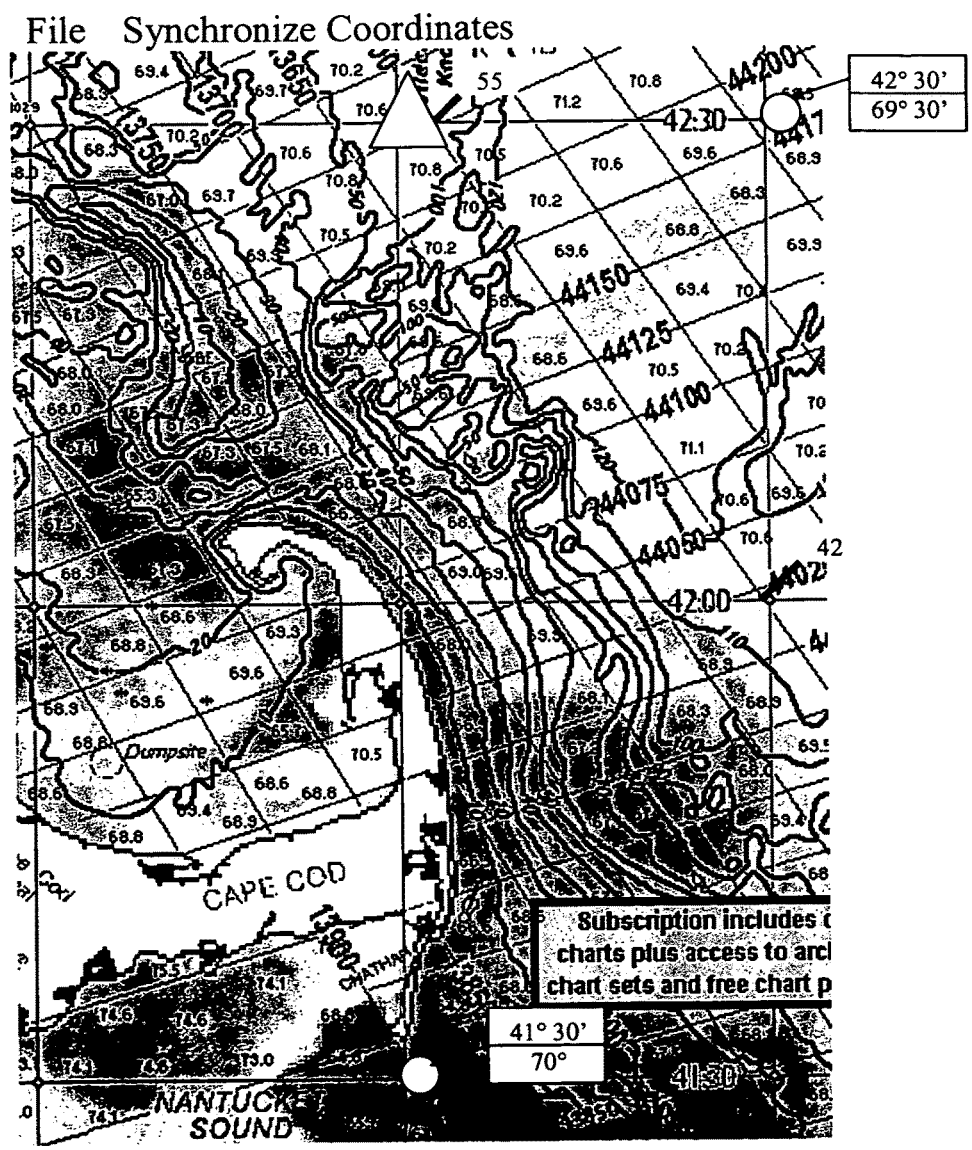
FIG. 5 is an illustration of a fish finding system in accordance with the invention, wherein the location of the boat is shown in the enlarged map of FIG. 4.

FIG. 5 shows the interface of the separate computer program with the underlying magnified ocean surface temperature and ocean depth map of FIG. 4. In this figure the menu bar of the separate computer application with a transparent window is shown having file with an option to quit and a second menu, which says synchronize coordinates. When this menu is activated, the computer asks the user (i) to select two locations one followed by the other; and (ii) to enter latitude and longitude coordinates. This is indicated by the user selecting the intersection of 70° longitude and 41° 30' latitude as the first point and entering numbers in the edit fields. The second point selected is at the intersection of 69° 30' longitude and 42.30° latitude, and the corresponding numbers are recorded by the computer. Now the computer creates the position of the boat using this defined coordination system and the GPS data provided. For example if the GPS data is latitude 42° 30' and longitude is −70 degrees, the boat is drawn at 55. As the boat sails, a new position is plotted, erasing the old position of the boat. The boat pointing direction is oriented in the same direction as the boat movement.

The navigational aid system for fisherman comprises the following features in combination:

1) a computer connected to the Internet for accessing high resolution maps of ocean surface temperature and ocean depth profiles using an Internet browser software or other Internet site specific software;
2) the map having longitude and latitude reference lines marked therein;
3) the map being magnified to represent approximately 60 mile by 60 mile (97 kilometer by 97 kilometer) area on the computer screen;
4) the computer being connected to a specialized GPS unit that receives the satellite based longitudinal and latitude coordinates of the boat location and communicates these two numbers to the computer;
5) a separate computer program having a transparent window showing the underlying magnified ocean surface temperature and ocean depth profile map and a menu bar having a first menu item for quitting the application and a second menu item for synchronizing a coordinate system with the latitude and longitude lines of the map;
6) the synchronize coordinate menu asking the user to select two points on the map, one at a time, and to enter their latitude and longitude values, thereby creating a synchronized orthogonal coordinate axes;
7) the separate computer program receiving GPS coordinates of the boat and plotting the boat position in the transparent window overlay above the magnified map;
8) the computer program being operative, upon receipt of the next GPS coordinates of boat location, to activate a separate computer program erasing the previously displayed boat position, drawing a new boat position according to received GPS coordinates and orienting the direction of sailing along the direction of movement; whereby the fisherman is provided with substantially complete boat location information with respect to land geometry, ocean depth, ocean surface temperature and location of possible hazards such as buoys, wrecks and other hazards.

Having thus described the invention in rather full detail, it will be understood that such detail need not be strictly adhered to, but that additional changes and modifications may suggest themselves to one skilled in the art, all falling within the scope of the invention as defined by the subjoined claims

What is claimed is:

1. A navigational aid system for fishermen comprising:
    a. a computer program, running on a computer, configured to connect to the Internet to access one or more high resolution maps of ocean surface temperatures and one or more ocean depth profiles using an Internet browser software or other Internet site specific software;
    b. said map having longitude and latitude reference lines marked thereon;
    c. said computer being connected to a specialized GPS unit that receives the satellite signals computing longitudinal and latitude coordinates, a fisherman's boat location, and communicates these two numbers to said computer;
    d. a separate computer program having a transparent window showing the underlying said ocean surface temperature and ocean depth profile map and a menu bar having a menu item for quitting said separate computer program and a menu item for synchronizing a coordinate system with the latitude and longitude lines of said map;
    e. when activated, said synchronize coordinate menu asking the user to select two points on said map, one point at a time, and enter latitude and longitude values of each point, thereby creating a synchronized orthogonal coordinate axes;
    f. said separate computer program receiving GPS coordinates of the boat and automatically plotting a pictogram of the boat position in the transparent window overlaying said map;
    g. said computer program, upon receipt of the next GPS coordinates of boat location, automatically actuating said separate computer program, erasing said previously displayed pictogram of the boat position, drawing a pictogram of said boat's new position at a screen location according to received GPS coordinates and orienting the pictogram along a direction of movement of the boat, matching a sailing direction of the boat;
    h. said map of ocean surface temperature and ocean depth profiles includes the presence of obstructions and hazard information, such as buoys or submerged wrecks;
    i. said map of ocean surface temperature and ocean depth profiles includes an overlay of weather related image;
    j. said specialized GPS has a memory resident program that automatically communicates latitude and longitude coordinates without said computer having to request said coordinates stored in a memory buffer;
    k. said computer programs being stored on non-transitory computer readable storage mediums;
    l. wherein said fisherman is automatically provided with an exact match of coastline information for visual matching of said boat's location;
    m. wherein said fisherman is automatically provided with hazards present near said boat's location and along its sailing direction;
    n. wherein said fisherman is automatically provided with weather related hazards present near said boat's location and along its sailing direction;
    o. said map of ocean surface temperature and ocean depth profiles is magnified to yield a displayed map grid of a high resolution image in a 60 mile by 60 mile area; and
    p. said ocean surface temperature and ocean depth profile map remains in place unchanged and only said boat location is updated, wherein an updated magnified ocean surface temperature and ocean depth profile map is loaded when said fisherman comes to boundaries of said displayed map grid in order to establish a coordinate correlation thereof, and said coordinate correlation between the boat location and an ocean thermal profile, ocean water depth or hazard location guides the fisherman to locations where fish are likely to be found, increasing prospects for a safe and successful catch;

whereby a navigational aid that combines data concerning ocean surface temperature and ocean depth profile with data indicating the precise location of the fisherman's boat as it travels within a large body of water, thereby automatically provides the fisherman with substantially complete boat location information on said computer screen with respect to ocean depth and ocean surface temperature within a 10 to 30 mile region surrounding the fisherman's boat.

2. A navigational aid system for fishermen as recited by claim 1, wherein said weather related image is a Doppler radar image.

3. A navigational aid system for fishermen as recited by claim 1, wherein said weather related image is a satellite IR radar image.

* * * * *